Dec. 23, 1952      H. M. BRAMBERRY      2,622,591
LOW-PRESSURE STEAM COOKER

Filed Oct. 14, 1947      3 Sheets-Sheet 2

INVENTOR.
HARRY M. BRAMBERRY
BY
Scrivener & Parker
ATTORNEYS

Dec. 23, 1952 H. M. BRAMBERRY 2,622,591
LOW-PRESSURE STEAM COOKER
Filed Oct. 14, 1947 3 Sheets-Sheet 3

INVENTOR.
HARRY M. BRAMBERRY
BY Scrivener & Parker
ATTORNEYS

Patented Dec. 23, 1952

2,622,591

UNITED STATES PATENT OFFICE 2,622,591

LOW-PRESSURE STEAM COOKER

Harry M. Bramberry, New Castle, Ind.; Harry M. Bramberry, Jr., administrator of said Harry M. Bramberry, deceased, assignor, by direct and mesne assignments, to himself Application October 14, 1947, Serial No. 779,781

7 Claims. (Cl. 126—381)

This invention relates broadly to cooking utensils and, more particularly, has to do with cookers of the type in which food is cooked by contact with steam under low pressure and while being held out of contact with the water which produces the steam.

In known cooking utensils of the type to which this invention relates steam is produced in a container, caused to pass about and through the food, condensed on the inner surface of a cover, and allowed to fall into and through the food container to the reservoir of boiling water. In passing downwardly through the food into the reservoir of boiling water, the water of condensation leaches from the food much that should not be removed and also leaves the food soft and soggy. It has accordingly been an object of this invention to provide a cooking utensil of a new type which will not be subject to this undesirable characteristic and which will be so constructed and operative that the water of condensation will not come into contact with the food in returning to the reservoir of boiling water, but will flow from the cover, where it has been condensed, to the reservoir without passing through the food container, whereby the food is solid and firm after cooking. In this connection, it has been a further object of my invention to provide means for utilizing the water of condensation as a means for preventing the passage of steam through the cooker in any way other than through the food container and into contact with the condensing surface of the cover.

It is well known that solid and liquid substances come off of, or out of, food when it is cooked. These substances, which are called secondary products in this application, are sometimes useful, for example as gravy, but are often undesirable, an example being those products which are produced during the steaming or other cooking of frozen foods, seafoods, etc. When such substances are produced in cooking foods in known pressure cookers they fall into the reservoir of boiling water causing several undesirable results. One of these is that any useful secondary products become diluted by the cooking water and are therefore lost or made less desirable. Another is that the presence of grease or other contamination in the boiling cooking water causes it to bubble and froth, thus often clogging the cooker. It has been an object of my invention to provide a low pressure cooker which would not be subject to these disadvantages and in which the secondary products are always isolated from the cooking water, whereby they may be preserved without dilution and whereby the cooking water is maintained clean at all times.

Another object of the invention has been to provide a food container, for a cooker of the desired type, having a perforated bottom which is so constructed that it will not become completely clogged by food when used to cook the type or kind of food with which it is intended to be used.

A further object of the invention has been to provide a cooker of the described type having means for injecting steam into the food from many different directions whereby it is cooked more rapidly and thoroughly.

A still further object of the invention has been to provide a cooker of the described type having a new form and configuration whereby the cooker may be easily handled and is also given a new and pleasing appearance.

These and other objects of the invention are achieved by the cooking devices disclosed in this application which, it will be understood, are only illustrative of the many forms the invention may take.

In the drawings forming part of this application:

Figure 1:
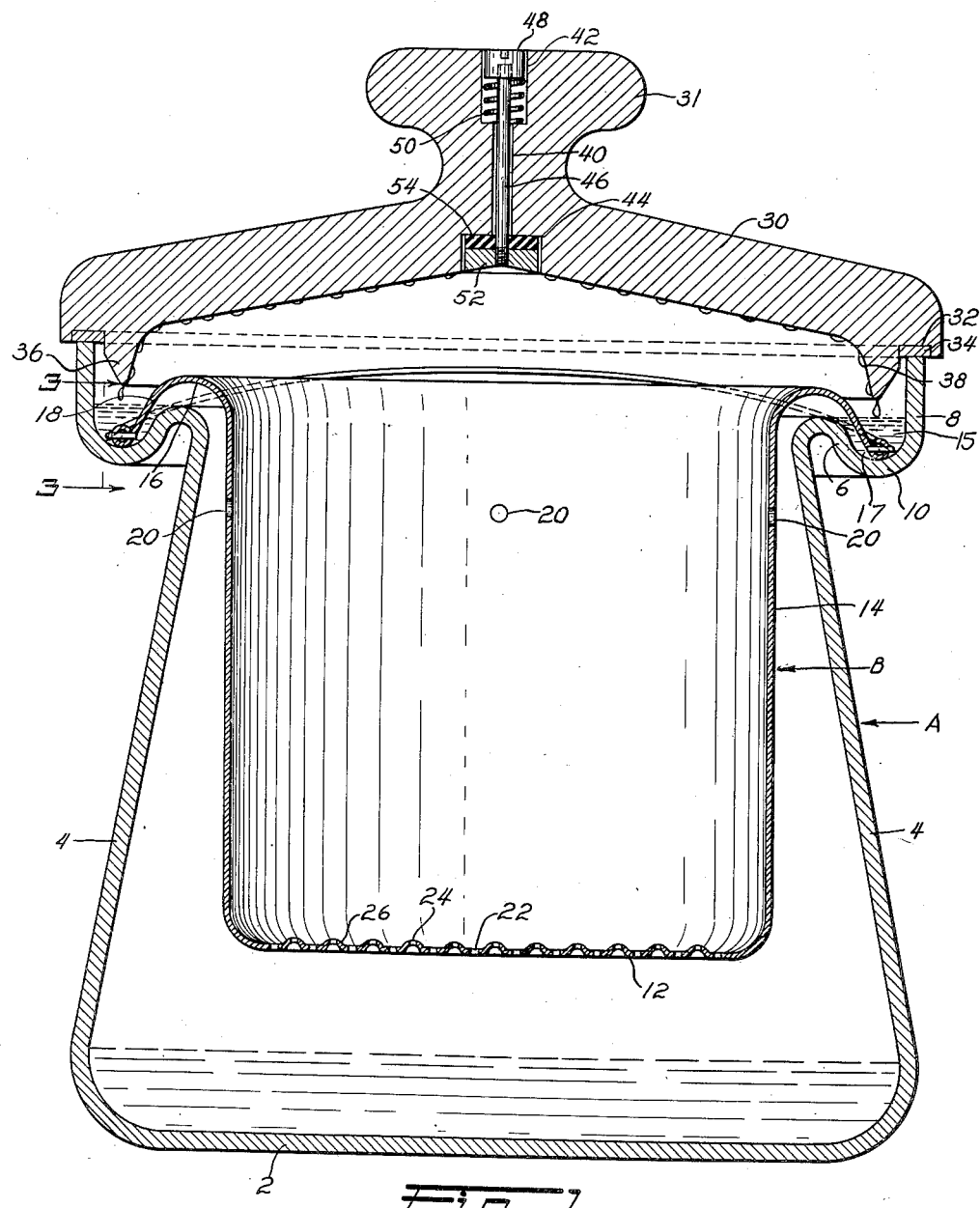
Fig. 1 is a sectional view through a cooking device formed in accordance with this invention.
Figure 3:
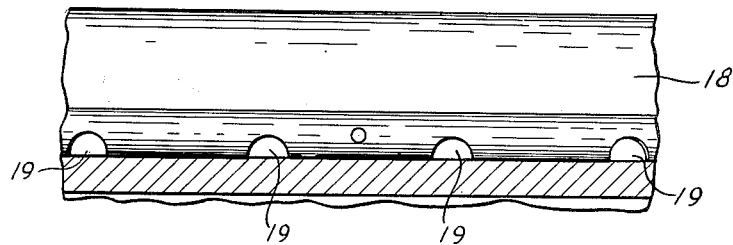
Fig. 3 is a partial sectional view taken on line 3—3 of either of Figs. 1 and 2.

The cooking device disclosed in Fig. 1 comprises a water container A having a bottom 2 and an upwardly converging annular side wall 4 which at its upper end is turned outwardly and downwardly about its periphery, as shown at 6, and then vertically upwardly at 8 to provide a trough 10 which surrounds the upper end of the cooker. A cup-shaped food container B is provided and is adapted to be positioned within the water container but substantially out of contact therewith. This food container has a bottom 12 and an annular side wall 14 the annular upper end of which is curved upwardly, outwardly and downwardly, as at 16, to provide a downward flange 18 which surrounds the upper end of the container and which divides the trough into annular chambers 15 and 17, said flange having spaced openings 19 formed in its peripheral edge, as shown in Fig. 3, for a purpose to be explained hereinafter. The diameter of the outer edge of the flange 18 is approximately the same as that of the bottom of the trough 10 whereby the outer edge of the flange may be rested in the trough thereby supporting the container B and centering it with respect to the container A. In this position the side wall 14 of the food container is spaced inwardly of the side wall 4 of the water container at all points, the upwardly and outwardly curved part 16 is spaced inwardly of the upper edge of wall 4 of the water container and then above it, while the downwardly extending part 18 is disposed outwardly of the downwardly extending inner wall 6 of trough 10. It will be seen that the described structure and arrangement of parts provides a water container A having a trough at or adjacent its upper end which is entirely within the confines of the upper end of the wall of the container, i. e., the wall 8. It will also be seen that the structure and arrangement of the food container A, and its relation to water container B, are such that water overflowing from the trough 10 cannot pass into the food container because of the fact that the walls of the food container are spaced away from those of the water container at all points, whereby water must overflow from the trough directly through the openings 19 into the water container without passing into or through the food container.

The side wall of the food container is generally imperforate but preferably adjacent its upper end is provided with a few (four being shown) openings 20 which are preferably equally spaced about the circumference of the wall and through which steam is injected into or above the contents of the food container.

The bottom of the food container is perforated uniformly over its area by alternate openings 22 in undeformed parts of the bottom wall and other openings 24 which are formed in upwardly-extending semi-spherical indentations 26 formed in the bottom. By reason of this construction solid but firm pieces of food within container B will be supported on an irregular, perforate surface and cannot clog all of the openings through the bottom of the food container.

Means are provided by the invention for producing the good effects of pressure cooking without the complicated apparatus of high pressure cookers and without producing the unnecessarily high pressures thereof. Such means, in the present invention, takes the form of a heavy cover 30 having an inner surface shaped as a low cone and having a handle 31. This cover extends over the entire water container A, covering the entire volume inside the upstanding wall 8. The cover is of sufficient weight to permit steam pressure to be built up within the container, which may advantageously be of the order of 1 to 3 inches of water, and in a successful cooker a cover weighing 3 pounds and being 8 inches in diameter was used. The cover is provided with an annular groove 32 adjacent its periphery within which is positioned a gasket 34 of rubber or other suitable material which rests on the annular upper edge of the vertical wall 8. I have found that by the use of such a substantially heavy cover steam pressure is built up within the cooker without the need of the clamps and valves of known pressure cookers but with the same advantageous results.

In operation, the cover intermittently opens under steam pressure and closes, whereby it acts as a low pressure cooker, the pressure of which is determined by the weight of the cover. The washer 34 prevents undesirable noise during this "fluttering" of the cover. The material and design of the cover are chosen to cause maximum condensation and I have found that glass or aluminum, among other materials, satisfactorily provides this effect.

Means are provided by the invention for returning to the trough 10 any and all water of condensation which forms on the inner surface of the cover, whence it flows directly to the water container without passing to or through the food container, all in the manner described hereinbefore. In a preferred embodiment such means comprises an annular downwardly extending flange 36 which is positioned just radially inwardly of gasket 34 and which is of such size and is so positioned that the lower end thereof overhangs the trough 10 and is spaced vertically above the upper end of side wall 4 of the water container and below the upper edge of wall 8 of the water container. The outer surface of the flange is inclined inwardly and is spaced inwardly of the inner surface of the outer wall 8 of trough 10, thereby leaving a space between these parts into which steam may pass, thus preventing water at the lower end of flange 36 from being blown out of the cooker. The inner surface of the flange 36 is connected to the conical inner surface of the cover 30 by a curved surface 38 to permit water to flow freely from the inner surface of the cover onto the flange, from which it drops into the trough 10. A vacuum relief valve is provided in the cover and comprises a passage 40 extending vertically through the cover and handle 31 and having an enlarged upper end part 42 and an enlarged lower end part 44 which, respectively, form recesses in the upper end of the handle and in the lower surface of the cover. A valve rod 46 extends through this passage and has a nut 48 on its upper end within the enlarged part 42 of the passage, between which and the bottom of the enlarged part is a spring 50 which constantly urges the valve rod upwardly. At its lower end the valve rod has attached to it within the lower recess 44 an abutment 52 between which and the bottom of recess 44 is a rubber valve member 54 which is constantly urged by spring 50 into engagement with the opening between passage 40 and the lower recess to close the passage 40 at its lower end.

In the use and operation of the described cooking utensil, water is placed in the container A to such a level that its upper surface is approximately half-way between the bottom 2 of the water container and the bottom 12 of the food container. Food is placed in the container B to any desired level and this container is hung in the water container with the flange 18 resting in the bottom of the trough 10, as shown in Fig. 1. The cover 30 is placed in position on the water container with the annular washer 34 resting on the upper edge of the wall 8. When the water in the container A boils, steam will pass through the apertures in the bottom of food container B and the apertures 20 in the side wall thereof. This steam will rise against the inner surface of the cover 30 and will condense thereon and flow outwardly and downwardly along the inner surface of the cover onto the flange 36 and will drop from the annular lower edge of the flange into the trough 10 which preferably already contains water placed in the trough at the beginning of the cooking operation. The water in the trough 10 will flow freely to both sides of the flange 18 of the food container because of the apertures 19 in the lower edge thereof. When sufficient water has collected in the trough 10, it will overflow into the water container A, passing directly over the upper edge of the wall 4 and down the inner side wall of that container. Because of the fact that all parts of the food container, particularly those at the upper end thereof and comprising the outwardly and downwardly turned parts 16, 18 are spaced from all parts of the water container, the overflow from the trough will not pass into the food container, nor will it come into contact therewith except where the flange 18 of the food container is immersed in the water of condensation in the trough 10. Because of the provision of the indentations 26 in the bottom 12 of the food container, no food of the type or kind which the cooker is intended to cook will be able to clog up the openings 22 and 24 in the bottom of that container. These closely-spaced indentations 26 serve the purpose of holding large pieces of food above the general lower surface of the bottom 12 thereby providing an irregular engagement between the food and the bottom of the container whereby some of the openings 22, 24 will be open at all times.

The openings 20 in the otherwise imperforate side wall of the food container admit steam in a lateral direction into or above the food within the container, thereby insuring that the food in the upper part of the container will be heated. These openings also act as relief openings when the openings 22, 24 through the bottom are restricted, thus preventing steam from forcing water from the trough 10. In this connection it will be seen that by increasing the depth of the trough 10, and thereby increasing the amount of water therein, greater steam pressure may be built up on the surface of this water when the openings 22, 24 become restricted, without blowing water out of the trough.

In the event that a vacuum should form within the water container A, atmospheric pressure on the upper end of nut 48 will force the nut, valve stem 46, abutment 52 and rubber valve member 54 downwardly, thereby admitting atmospheric air through the passage 40 and past the valve member 54 into the water container to relieve the vacuum. Other forms of vacuum relief valves may be provided without departing from the invention.

Figure 2:
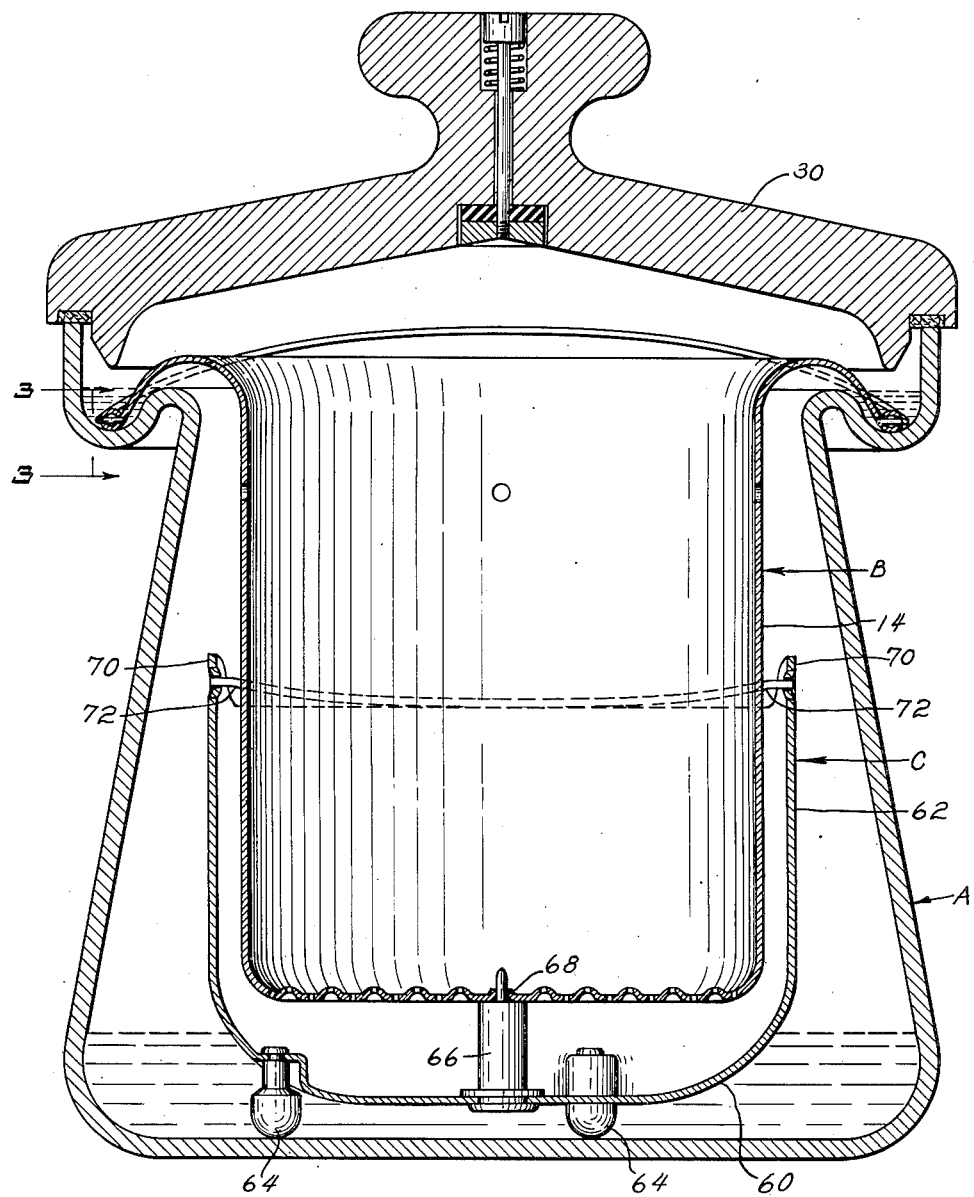
Fig. 2 is a sectional view through a preferred embodiment of the invention.

A preferred embodiment of the invention is disclosed in Fig. 2 and is identical in all respects with that disclosed in Fig. 1 but includes, in addition, means for catching and preserving the secondary products produced during the cooking of food in the container B. Such means comprise a cup-shaped container C having a curved bottom 60, side wall 62 and legs 64 whereby it may be supported on the bottom of the water container A with its bottom between the vertically-spaced bottoms of the water and food containers. The container C is of such size that its annular wall 62 surrounds the annular side wall 14 of the food container B to such a height that water which boils violently in the bottom of container A will not enter container C. The container C has an upwardly-extending post 66 at the center thereof the upper end of which is adapted to be received in an upward indentation 68 formed in the center of the bottom of the food container B in order to position the containers B and C accurately and properly with respect to each other. The container C also has bails 70 formed at diametrically opposite parts of the upper edge of the side wall thereof to which a handle 72 may be attached. If desired, the two containers B and C may be separably connected by suitable means to permit them to be moved into and out of the water container as a unit.

The use and operation of the embodiment of the invention disclosed in Fig. 2 is identical with that of Fig. 1, excepting only that the container C for secondary products is positioned within the water container resting on the bottom thereof and surrounding the food container. When the parts are properly positioned, in the manner shown in Fig. 2, the lower end of the food container will be received within the container for secondary products and any of such products formed during the cooking process will pass through the apertures in the bottom of the food container and will be caught and retained in the container C and, accordingly, will not pass into the cooking water, which will therefore remain clear and uncontaminated by the secondary products with all the advantages thereof which are described hereinbefore.

The provision of an outer container A having a trough externally surrounding its upper end permits the container or the entire cooking device to be lifted by engaging the fingers under the trough, this being facilitated by the upwardly converging shape of the side wall 4.

Figure 4:
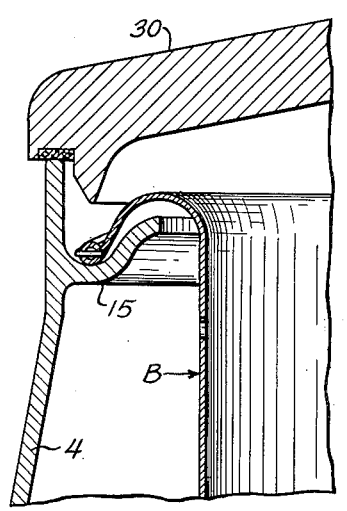
Fig. 4 is a partial view of a modified form of the invention.

The trough 10 does not necessarily externally surround the upper end of the water container and, as shown in Fig. 4, an inwardly extending annular trough 15' is provided which is integral with the side wall 4 of the container, the inner annular edge of the trough being spaced from the wall 14 of the food container B.

Figure 5:
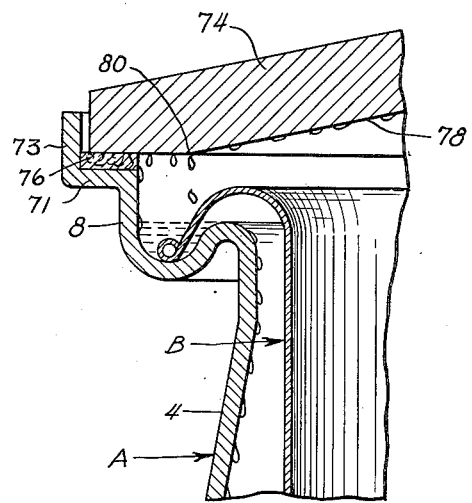
Fig. 5 is a partial view of a still further embodiment of the invention.

If desired, the flange 36 may be omitted and water of condensation allowed to drip directly from the cover to the trough, such a modified form of the invention being disclosed in Fig. 5 of the drawings. In this embodiment the upper end of the outer wall 8 of the trough is continued radially outwardly, as at 71, and then upwardly, as at 73, to provide an annular part for receiving the edge of the cover 74, an annular gasket 76 being positioned between the parts and connected either to the radial flange 71 on the container or to the lower edge of the cover. The conical inner surface 78 of the cover preferably terminates short of the outer periphery of the cover, forming an edge 80 which is positioned laterally above the trough 10 and vertically above the upper edge of side wall 4 of water container A and from which water which has condensed on the surface 78 drips into the trough.

Figure 6:
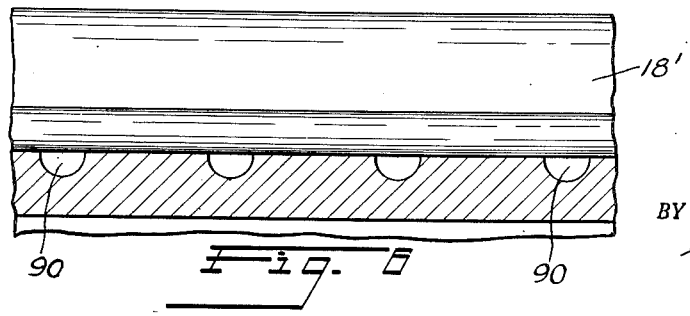
Fig. 6 is a view which is similar to Fig. 3 but shows a modified construction.

The passage of water of condensation between the two sides of flange 18 in trough 10 may be permitted by other means than openings 19 formed in flange 18. For example, in Fig. 6 there is disclosed an alternative structure in which the flange 18' is imperforate and openings 90 are formed in the upper surface of the bottom of trough 10.

While I have described certain embodiments of my invention, it will be apparent to those skilled in the art that other embodiments, as well as modifications of those disclosed, may be made without departing in any way from the spirit or scope of the invention, for the limits of which reference must be made to the appended claims.

What is claimed is:

1. A cooking utensil comprising a water container having a bottom, a side wall and an annular trough at the upper end of said side wall, a perforated food container having a bottom, a side wall and a downwardly extending annular flange at the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, a cover extending over the entire water container and supported thereby and having an inner surface which is inclined downwardly from the center toward the periphery and on which steam is condensed, and means for directing the water condensed on the inner surface of the cover into said trough.

2. A cooking utensil comprising a water container having a bottom, a side wall and an annular trough at the upper end of said side wall, a perforated food container having a bottom, a side wall and a downwardly extending annular flange at the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, a cover extending over the entire water container and supported thereby and having an inner surface which is inclined downwardly from the center toward the periphery and has an annular part forming the lowest extremity thereof which overlies said trough and is spaced vertically above the upper edge of the side wall of the water container.

3. A cooking utensil comprising a water container having a bottom, a side wall and an annular trough surrounding the upper end of said side wall, a perforated food container having a bottom, a side wall and a downwardly extending annular flange surrounding the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, a cover extending over the entire water container and supported thereby and having an inner surface which is inclined downwardly from the center toward the periphery and on which steam is condensed, and means for directing the water condensed on the inner surface of the cover into said trough.

4. A cooking utensil comprising a water container having a bottom, a side wall and an annular trough positioned inwardly of the upper end of said side wall, a perforated food container having a bottom, a side wall and a downwardly extending annular flange surrounding the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, a cover extending over the entire water container and supported thereby and having an inner surface which is inclined downwardly from the center toward the periphery and on which steam is condensed, and means for directing the water condensed on the inner surface of the cover into said trough.

5. A cooking utensil comprising a water container having a bottom, a side wall and an annular trough at the upper end of said side wall, a perforated food container having a bottom, a side wall and a downwardly extending annular flange at the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, a cover extending over the entire water container and supported thereby and having an inner surface which is inclined downwardly from the center toward the periphery, and a downwardly extending annular flange on the inner surface of the cover the lower edge of which overlies said trough and is spaced vertically above the upper edge of the side wall of the water container.

6. A cooking utensil comprising a water container having a bottom, a side wall and an annular trough at the upper edge of said side wall, a perforated food container having a bottom, a side wall and a downwardly-extending flange at the upper end of the side wall thereof, said flange forming with said trough a pair of annular chambers, and means for establishing communication between said chambers located within said trough, said food container and flange being of such size as to permit the edge of the flange to be rested in said trough with all other parts of the food container spaced from the water container, an imperforate cup-shaped container for secondary products positioned within the water container on the bottom thereof and receiving within it the lower end of the food container, a cover extending over the entire water container and supported thereby and having an inner surface which is inclined downwardly from the center toward the periphery and has an annular part forming the lowest extremity thereof which overlies said trough and is spaced vertically above the upper edge of the side wall of the water container.

7. A cooking utensil according to claim 6, in which the food container and the container for secondary products are separably connected.

HARRY M. BRAMBERRY.

REFERENCES CITED

The following references are of record in the file of this patent:

UNITED STATES PATENTS

| Number | Name | Date |
| --- | --- | --- |
| 64,142 | Potwin | Apr. 23, 1867 |
| 776,926 | Misener | Dec. 6, 1904 |
| 831,673 | Lynn | Sept. 25, 1906 |
| 844,272 | Fate | Feb. 12, 1907 |
| 930,389 | Kleinfelder | Aug. 10, 1909 |
| 1,103,169 | Beam | July 14, 1914 |
| 1,263,004 | Tollagsen | Apr. 16, 1918 |
| 1,290,771 | Meadows | Jan. 7, 1919 |
| 1,369,919 | Eliel | Mar. 1, 1921 |
| 2,321,749 | Howlett | June 15, 1943 |